(12) United States Patent
Zhou et al.

(10) Patent No.: US 6,351,559 B1
(45) Date of Patent: Feb. 26, 2002

(54) USER-ENCLOSED REGION EXTRACTION FROM SCANNED DOCUMENT IMAGES

(75) Inventors: Jiangying Zhou, Columbia, SC (US); Hongwei Shi, Elmhurst, NY (US)

(73) Assignee: Matsushita Electric Corporation of America, Secaucus, NY (US)

( * ) Notice: Subject to any disclaimer, the term of this patent is extended or adjusted under 35 U.S.C. 154(b) by 0 days.

(21) Appl. No.: 09/218,758

(22) Filed: Dec. 22, 1998

(51) Int. Cl.[7] .................................................. G06K 9/34
(52) U.S. Cl. ........................ 382/175; 382/306; 382/203
(58) Field of Search ................................. 382/173, 175, 382/176, 179, 305, 306, 317, 321, 203; 358/462; 707/517, 521

(56) References Cited

U.S. PATENT DOCUMENTS

| | | | |
|---|---|---|---|
| 5,048,099 A | | 9/1991 | Lee .............................. 382/22 |
| 5,619,592 A | * | 4/1997 | Bloomberg et al. ......... 382/176 |
| 5,748,809 A | * | 5/1998 | Hirsch ........................ 382/175 |
| 5,841,900 A | * | 11/1998 | Rahgozar et al. ........... 382/176 |
| 5,892,843 A | * | 4/1999 | Zhou et al. .................. 382/176 |
| 6,230,170 B1 | * | 5/2001 | Zellweger et al. .......... 382/306 |

* cited by examiner

*Primary Examiner*—Bhavesh Mehta
(74) *Attorney, Agent, or Firm*—Harness, Dickey & Pierce, P.L.C.

(57) ABSTRACT

In accordance with the teachings of the present invention, a user-enclosed region extraction device allows users to store, in a digital format, only selected portions of a document image. The user can enclose any text or printed material within a user drawn mark. A connected component analyzer analyzes the document in a bitmap format which allows the device to detect potential user-enclosed regions regardless of the content of the document image. A bi-connected component module allows the user to enclose a region with a mark that can be of any shape. The user drawn enclosure can cross lines of text or graphics on the document paper. A detection analyses filter uses a number of heuristics to eliminate small characters and graphics that may resemble a user drawn mark. The user can save space on the computer storage medium by extracting the user-enclosed region from the document image using a extraction module.

20 Claims, 4 Drawing Sheets

USER-ENCLOSED REGION EXTRACTION FROM SCANNED DOCUMENT IMAGES

BACKGROUND AND SUMMARY OF THE INVENTION

The present invention relates generally to document processing. More particularly, the invention relates to the extraction of a user-enclosed portion of text or non-text regions from bitmap images.

People like to scribble marks and notes on documents while reading. For example, when a person is reading a book or a magazine, he or she might draw circles with a pen over the parts that are of particular interest. When the person underlines a few lines, circles a paragraph, writes notes on a page these notes and marks often convey important cues to the content of the document and may serve as keys or references for communications with other people. As more and more paper documents are now being converted and archived in electronic media, it is useful if these underlines, highlights, circles, handwritten or Post-It notes on a paper document can be automatically identified, located, their associated contents extracted and preserved in a document management system.

The present invention describes a technique for locating and extracting one type of user-drawn marks from a scanned document—the user enclosed regions. The invention is based on the bi-connected component analysisi in graph theory. The invention first represents the content of the input image as run-length segments. The invention then constructs line adjacency graphs from the segments. Finally, the invention detects user-enclosed cicles as bi-connected components of the line adjacency graphs.

The present invention is useful in applications such as in an electronic filing system or in storage management for document databases. Currently, the burden of cutting and pasting a selective region from a page (for example, an article from a newspaper) for archival is on the user. However, a user is sometimes only interested in specific portions on a page. The circled region extraction technique offers a means for a user to simply mark the regions of interest and let the imaging process identify the regions and save them alone. Alternatively, different compression strategies may be applied to user-enclosed regions to preserve the quality of the image in these regions.

The present invention analyzes the image of the scanned document in its native bitmap format using a connected component module. The invention is writing system independent. It is capable of extracting user-enclosed regions from document images without regard to what character set or alphabet or even font style has been used. The connected component module then stores the components of the image that are connected. The connected component data is stored in a datastructure in the form of a line adjacency graph to expedite the further processing of the connected component data.

The connected component data is then analyzed by a graph traversal module to extract geometric properties of each connected component and store the geometric properties in a datastructure. The geometric features extracted are those geometric features that are necessary for further analysis by the invention.

The invention then separates the largest bi-connected component from the user-enclosed regions of the document image by utilizing a bi-connected component module. The bi-connected component module detects any enclosure regardless of shape. Furthermore, the user drawn enclosure can cross lines of text or graphics on the document paper and still be recognized as a bi-connected component. The bi-connected component module utilizes a depth-first search that allows the detection of the largest bi-connected component to be done in an efficient manner.

Following the bi-connected component module, a detection analysis filter further refines the extraction process by qualifying each user-enclosed candidate. These additional heuristics eliminate from the possible selection of user-enclosed regions those bi-connected areas that are not above a minimum size, or are photographic images.

After having selected the user-enclosed regions the extraction module separates the bitmap portion that lies within the user-enclosed region and stores that extracted portion of the document image in a storage medium for future reference and manipulation by the user. The present invention enables the user to save a large amount of disk storage space by extracting only the portions of the document image that the user is interested in.

For a more complete understanding of the invention, its objects and advantages, reference may be made to the following specification and to the accompanying drawings.

DETAILED DESCRIPTION OF THE PREFERRED EMBODIMENTS

The present invention is designed for locating and extracting user-enclosed regions from a scanned document. Accordingly, in FIG. 1, a system utilizing the invention to extract user-enclosed regions from scanned documents for storing and printing the extracted regions has been illustrated.

Figure 1:
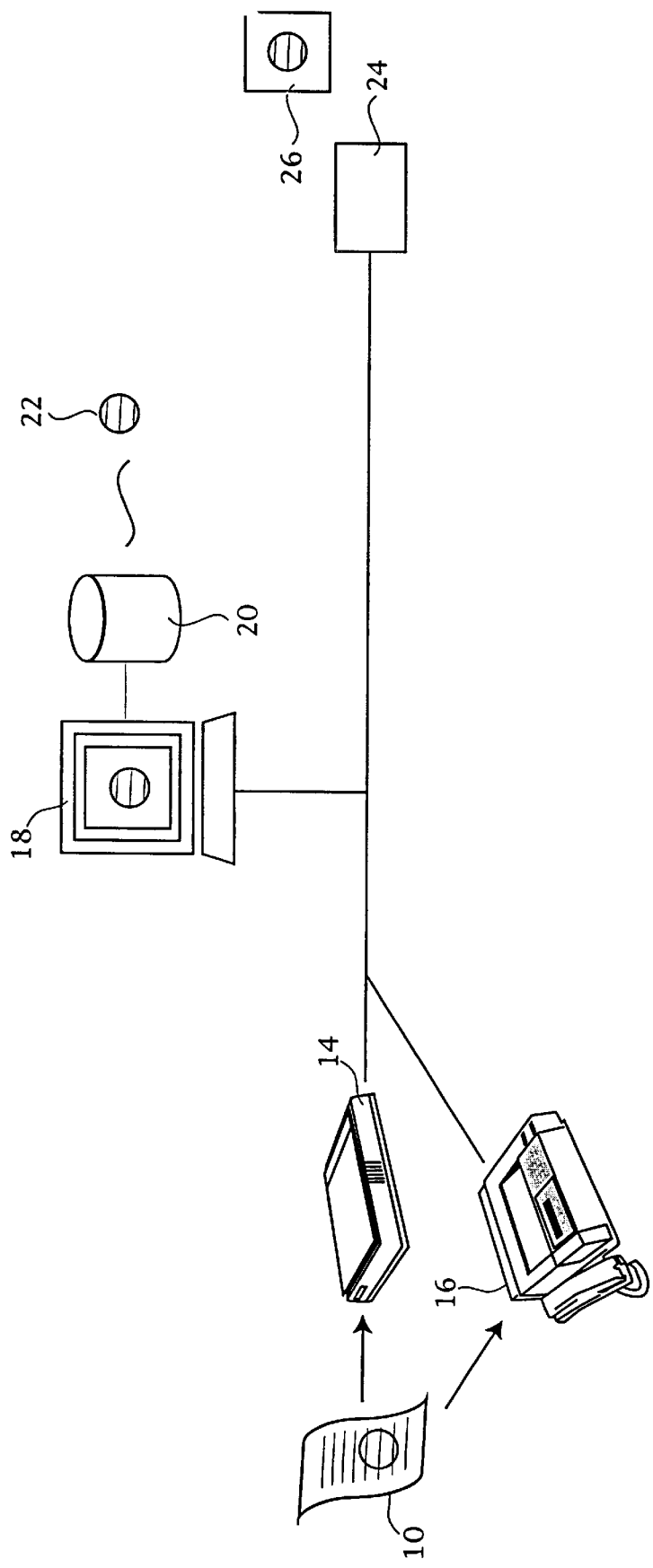
FIG. 1 is a block diagram giving an overview of the system architecture in which the invention may be employed.

The user-enclosed region extraction device of the present invention is preferably either a computer implemented software program run on a suitable computer system or an embedded system suitable for incorporating into an imagining device, such as within the imaging processor of a scanner or the like. As illustrated in FIG. 1, the user-enclosed region extraction software program runs on a computer system 18. The computer system 18 is coupled to various peripheral devices through suitable communication connections where the peripheral devices perform various tasks such as scanning and printing. The computer system 18 can be any commercially available computer system. The presently preferred embodiment is designed to run on a Microsoft Windows 95/NT operating system Although, other operating systems, including Unix systems, may be used as well. The computer system 18 of the present invention is attached to the peripheral devices directly by communication interface cards, as are well known in the art, and by a standard communication cable. The peripheral devices may also be connected via network.

In the present invention a user will take a document 10 and circle or enclose the desired contents within the document 10 by using a pen or any other writing utensil that leaves a mark which is readable by a scanner 14 or a fax machine 16. The scanner 14 will transmit the data over the communication link to the computer 18. The computer 18 extracts the user-enclosed region and in the preferred embodiment stores the extracted image 22 in the personal computer's hard disk 20. The user may print the extracted user-enclosed regions if desired, on a printing device such as a laser printer 24.

Figure 2:
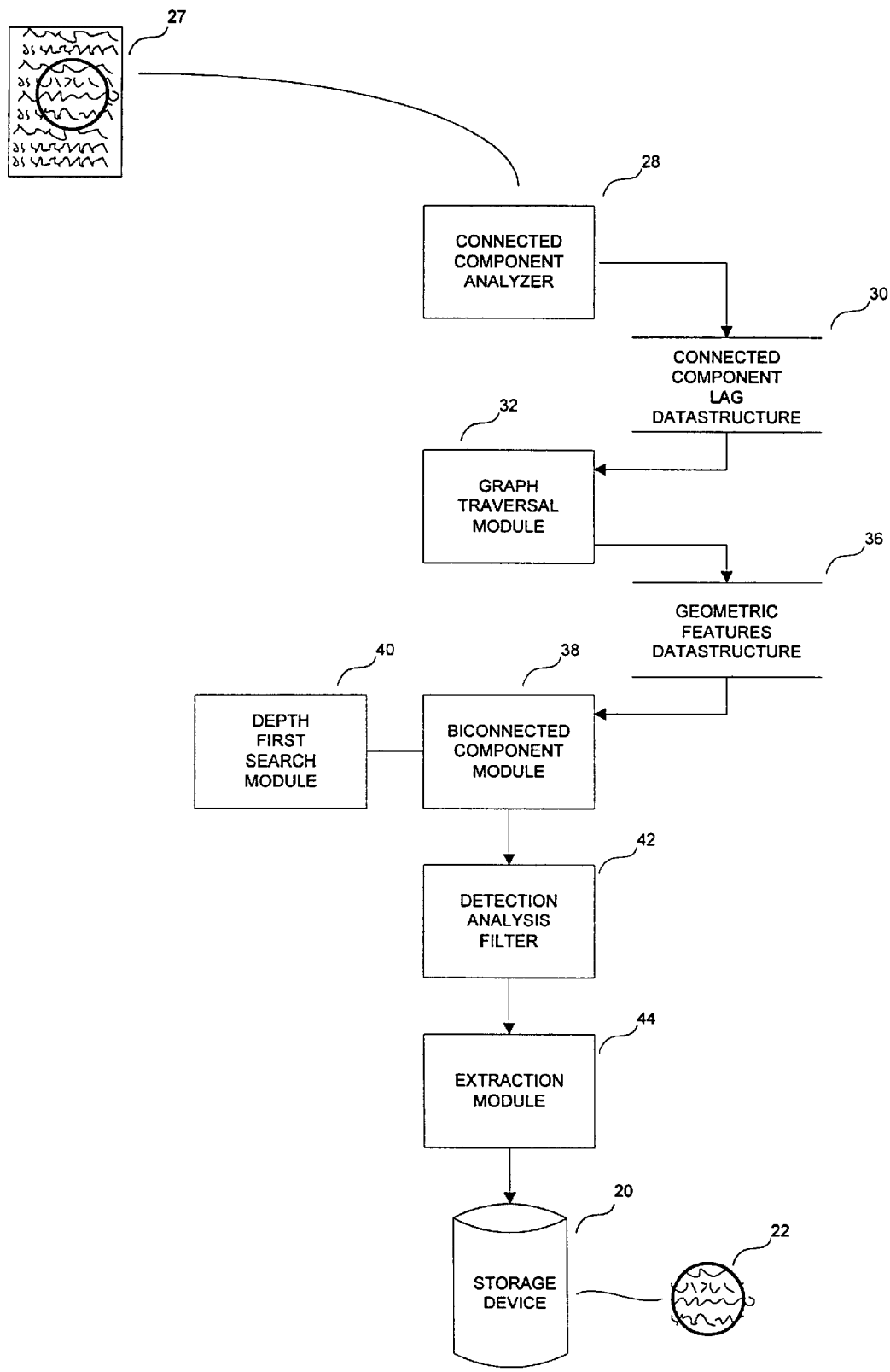
FIG. 2 is a system block diagram of the preferred embodiment of the present invention.

Referring to FIG. 2, a software block diagram of the system is illustrated. The functional blocks illustrated in FIG. 2 are embodied in and operated by the processor of the computer system 18. The computer-implemented software system employs a group of processing modules, each designed to perform different data manipulation functions. These processing modules have been illustrated by enclosed rectangles. The data structures have been illustrated using open-ended rectangles, to distinguish them from the processing modules. Also, to aid in understanding the invention, the processing modules of the invention have been arranged in a top-down order, showing the sequence in which various modules are placed in service.

An exemplary page of image data, such as a page 27 from a magazine article, has been illustrated. Although the visual image of page 27 is illustrated here, it will be understood that the page 27 actually comprises image data, such as bitmap image data, in which individual black or white pixels of the image are stored as binary numbers.

First, the connected component analysis is performed by an analyzer 28 upon the bitmap image data of the page 27. A connected component in a binary image is a maximal set of touching black pixels. Essentially, the connected component extraction process starts with a given data element within the bitmap image data of the page 27 and analyzes the adjacent data elements to determine whether they comprise part of a connected component. For example, the black dots that form the letter "A" or a user drawn circle are all connected and thus comprise a connected component.

In the preferred embodiment the connected component analysis is performed in a raster-scan fashion whereby contiguous black pixels in the same horizontal line are created and treated as a single unit called a segment. A line adjacency graph algorithm is then used to represent the segments produced by the connected component analyzer 28 in a line adjacency graph that is to be stored in a connected component LAG data structure 30.

Figure 3A:
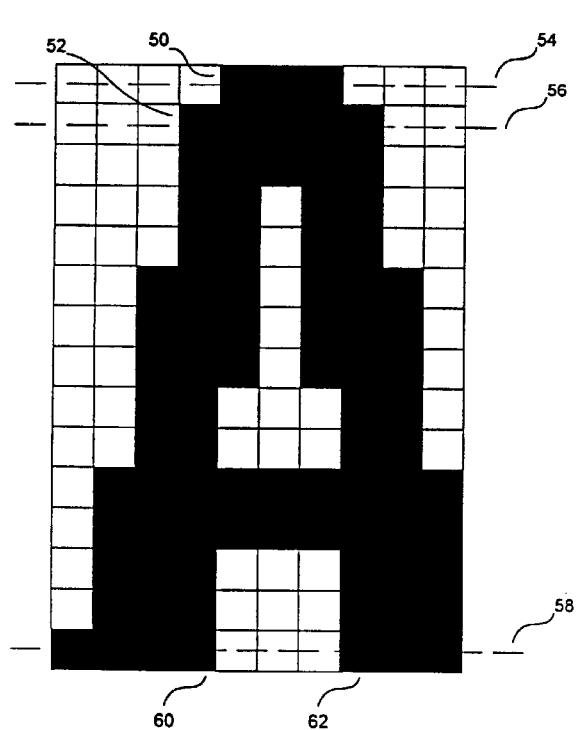
FIG. 3a and 3b are the graphical representation of a connected component and its corresponding line adjacency graph.
Figure 3B:
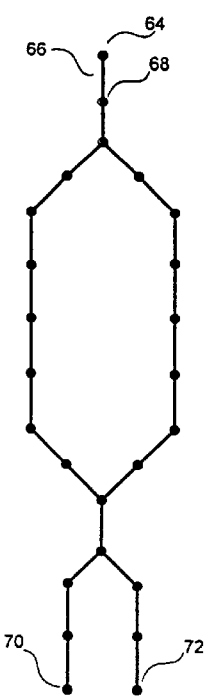

FIGS. 3a and 3b illustrate how a connected component from a bitmap image is converted into a line adjacency graph for storage in the connected component LAG data structure 30. The overlapping black segments at the top of the connected component shown in FIG. 3a have corresponding representations in the line adjacency graph shown in FIG. 3b. Each black segment is represented as a node in the line adjacency graph. For example, the connected component shown in FIG. 3a contains a segment 50 along scan line 54 which is represented as a node 64 in the corresponding line adjacency graph that is shown in FIG. 3a. Likewise, segment 52 along scan line 56 is represented as node 68. Scan lines 54 and 56 are adjacent in the image. If two or more black segments are adjacent in the vertical plane, that adjacency is represented as an edge in the line adjacency graph. For example, the segments 50 and 52 are adjacent in the vertical plane, therefore the corresponding nodes 64 and 68 are joined by a line 66 in the corresponding line adjacency graph. Segments that are separated in the horizontal plane are also separated in the line adjacency graph of the connecting component. For example, the black segments 60 and 62 are separated by a space along the scan line 58. The corresponding nodes 70 and 72 corresponding to segments 60 and 62 are also separated in the graph.

Figure 4:
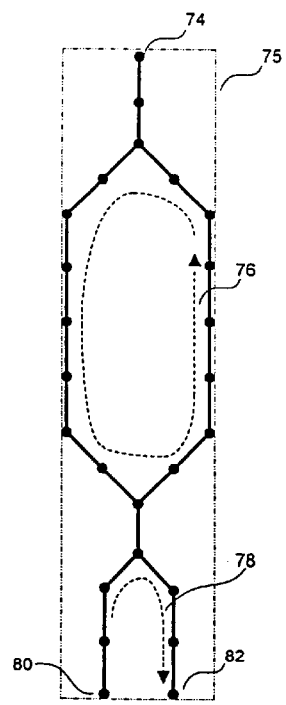
FIG. 4 illustrates various geometric features of a connected component in the form of a line adjacency graph.

After the connected component LAG datastructure 30 has been populated by the connected component analyzer 28, a graph traversal module 32 is then called upon to extract certain geometric features from each connected component and store them in a geometric features datastructure 36. FIG. 4 illustrates various geometric features of a connected component which include the width and height of a bounding box 75 where the bounding box 75 is defined as the smallest rectangle that can encompass the connected component. Further geometric features include the an area of the bounding box 75, number of holes 76, the number of upward and downward arcs 78, the number of downward ends 80 and 82, the number of upward ends 74, and various other geometric features.

After the geometric features datastructure 36 has been populated, a bi-connected component module 38 is used to separate all bi-connected components from the rest of the image content. The bi-connected component module 38 accesses the connected component LAG datastructure 30 to analyze each line adjacency graph of a connected component for bi-connected components.

Figure 5C:
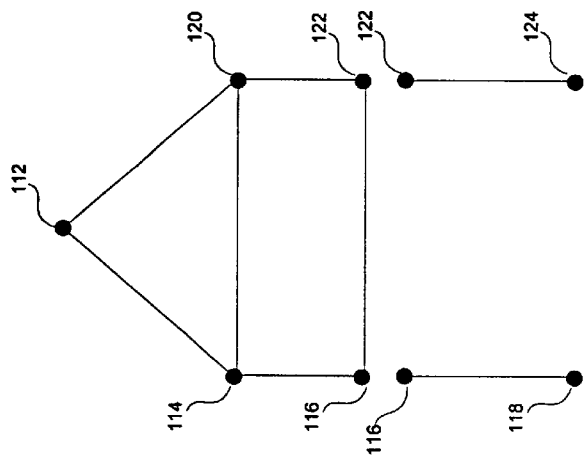
FIG. 5c illustrates the separation of a non-bi-connected component into separate bi-connected components.
Figure 5B:
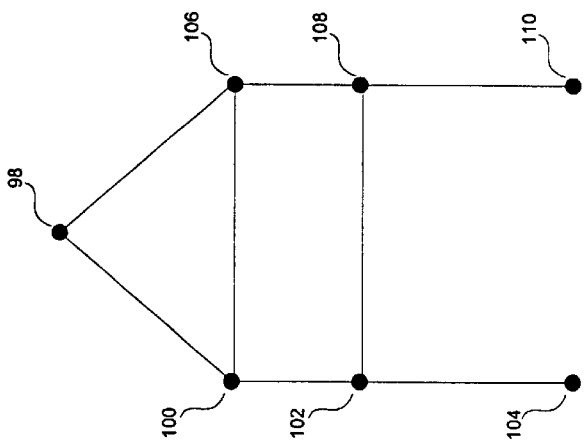
FIG. 5b illustrates a representation of a non-bi-connected graph of a connected component.
Figure 5A:
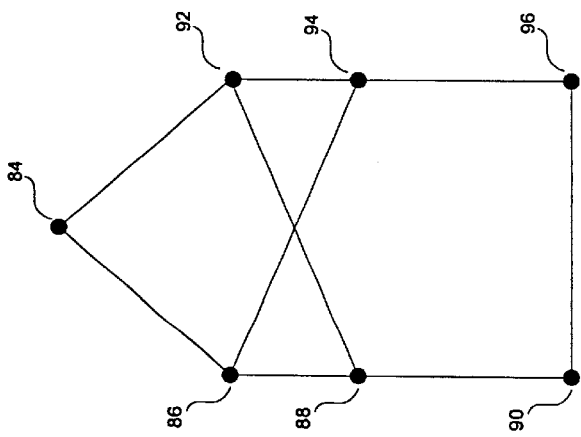
FIG. 5a illustrates a representation of a bi-connected graph of a connected component.

A line adjacency graph connected component is defined as bi-connected if the removal of any of its nodes does not break the graph into disconnected sub-graphs. FIG. 5b illustrates a non-bi-connected graph where disconnecting nodes 102 and 108, would yield separate connected components having 3 sub-graphs, as shown in FIG. 5c. FIG. 5a shows a bi-connected component where the removal of any one of the nodes 84, 86, 88, 90, 92, 94, and 96 will not break the graph into separate sub-graphs. A graph may contain several bi-connected components. A bi-connected component is, by definition, the largest sub-graph that is bi-connected. Thus the system decomposes a line adjacent graph into its bi-connected componenents. For example, the connected component that contains the nodes 84, 86, 88, 90, 92, 94 and 96 is a bi-connected component.

In the preferred embodiment of the invention the bi-connected component module 38 utilizes a depth-first search module 40 for determining the amount and size of the bi-connected component sub-graphs from the graph. The module 40 first initializes all nodes of the graph as being unvisited. Processing of the graph starts from an arbitrary node known as the root node. Each node is processed when it is first discovered. Once a node is processed a bit is then set, thereby indicating that the particular node has been visited. The adjacent nodes that are connected to the node being processed are scanned to determine if they have been processed. Each time an unvisited node is discovered it is processed recursively by the algorithm. After a node's adjacent neighbors have been processed, the algorithm returns to the previous node until it has returned to the root node and processed all nodes that are connected to that root node. Then the next unprocessed node in the graph is chosen as a root node and the same procedure is repeated again until every node in the entire graph has been visited. The information associated with each node is utilized to determine the largest bi-connected component of the line adjacency graph.

A detection analysis filter 42 supplies the functionality needed to reduce the false detection of user-enclosed regions after the bi-connected component module 38 has processed the line adjacency graphs of the connected component from the connected component LAG datastructure 30. For example, false bi-connected components may include a large print character like the letter "o", a part of a photographic element that contains many holes, or graphic elements that contain holes. The above mentioned examples must be distinguished from the user-enclosed region. In order to reduce the false detection of user-enclosed circles in the presently preferred embodiment, a number of heuristics are employed to distinguish the user-enclosed region from bi-connected components that are not user-enclosed.

The first heuristic is a minimum size detector. The minimum size detector compares the bounding box 75 of all the bi-connected components that have been found by the bi-connected component module 38 to a predetermined size. Since characters that contain holes can be considered as connected components, and the characters are relatively small when compared with a typical user-enclosed region, a minimum size threshold is set for bi-connected components to be considered as a user-enclosed region. In the preferred embodiment the width and height of a bounding box must be 1/10 of the total image width and height. For example, the detector first determines the width and height of the image, then compares the height and width of the bi-connected component to the height and width of the image. If the width and height are not greater than the width and height of the image then that particular bi-connected component is discarded as a possible user-enclosed region.

Another heuristic is a rectangle frame detector. In most newspaper and magazine articles a rectangle frame encloses text, photographs and graphics. The bi-connected component module will consider a rectangle frame a bi-connected component. The rectangle frame detector eliminates such bi-connected components from further consideration. The rectangle frame detector utilizes the fact that a rectangle has two parallel sides while the user-enclosed region will not have parallel sides. The rectangle frame detector calculates the distance from the left most pixel of a bi-connected component to its right most pixel along each scan line. The average distance and the standard deviation of all the scan lines is calculated. If the standard deviation is larger than a given threshold then the bi-connected component is considered a user-enclosed region candidate. In the preferred embodiment the threshold is set at 10% of the average distance. The bi-connected component that has a given standard deviation less than a predetermined threshold is discarded.

A third heuristic, a photograph element detector distinguishes a photographic region from a user-enclosed region. A photographic region typically has a much higher black-pixel density than the area that is user-enclosed. The photograph element detector calculates the percentage of black pixels in the bounding box 75. In the preferred embodiment of the invention the threshold percentage is calculated as 40%. If the pixel density is higher than 40% the bi-connected component is discarded from the list of user-enclosed regions.

An extraction module 44 extracts the image component enclosed by each user drawn enclosure. The extraction module 44 performs the extraction by identifying the leftmost black pixel and the rightmost black pixel on each scan line. The region bounded by the leftmost and rightmost black pixels is the user-enclosed region and is extracted. The extracted region 22 is, in the preferred embodiment, stored in a storage device 20 such as a hard disk.

While the invention has been described in its presently preferred embodiment, it will be understood that the invention is capable of certain modifications without departing from the spirit of the invention as set forth in the appended claims.

What is claimed is:

1. An apparatus for extracting an user-enclosed region of a document image, comprising:
    a connected component analyzer for identifying a plurality of connected components from said document image where each connected component has a plurality of consecutive black pixels;
    a graph traversal module connected to said connected component analyzer for extracting geometric features of said connected component;
    a bi-connected component module connected to said graph traversal module for selecting a bi-connected component from said connected components; and
    a detection analysis filter connected to said bi-connected component module for comparing said geometric features of said selected bi-connected component to a predetermined limit and using said comparison to detect said user-enclosed region of said document image.

2. The apparatus of claim 1 further comprising:
    An extraction module connected to said detection analysis filter for removing said user-enclosed region from said document image by identifying a leftmost black pixel and a rightmost black pixel for each scan line of said user-enclosed region.

3. The apparatus of claim 1 wherein said geometric features being selected from a group consisting of a bounding box, a black pixel density of the bounding box, a standard deviation of an average distance between the left most and the rightmost pixel along each scanline and combinations thereof.

4. The apparatus of claim 3 wherein said predetermined limit being selected from a group consisting of the bounding box having a width and height that is a predetermined percentage of the document image width and height, the black pixel density of the connected component where said density is a predetermined percentage, the standard deviation is a predetermined percentage and combinations thereof.

5. The apparatus of claim 1 wherein selection of a bi-connected component uses a depth-first search for locating a plurality of said bi-connected components within the document image.

6. The apparatus of claim 1 wherein said geometric features of said plurality of connected components being selected from the group consisting of an area of the connected component, a bounding box, a black pixel density of the bounding box, a number of holes, a number of upward and downward arcs, a number of downward ends, a number of upward ends and combinations thereof.

7. The apparatus of claim 1 further comprising:
    a connected component LAG data structure connected to the connected component analyzer for storing a connected component as a plurality of nodes for representing black segments in every scan line and their relationship between scan lines.

8. The apparatus of claim 1 further comprising:
    a geometric features data structure connected to the graph traversal module for storing said extracted geometric features of said plurality of said connected component.

9. The apparatus of claim 2 further comprising:

a storage device connected to the extraction module for storing said user-enclosed region of said document image.

10. An apparatus for extracting a user-enclosed region of a document image, comprising:

a connected component analyzer for identifying a plurality of connected components from said document image where each connected component has a plurality of consecutive black pixels;

a graph traversal module connected to said connected component analyzer for extracting geometric features of said connected component where said geometric features being selected from the group consisting of an area of the connected component, a bounding box, a black pixel density of the bounding box, a number of holes, a number of upward and downward arcs, a number of downward ends, a number of upward ends and combinations thereof;

a bi-connected component module connected to said graph traversal module for selecting a bi-connected component form said connected components;

an detection analysis filter connected to said bi-connected component module for comparing said geometric features of said selected bi-connected component to a predetermined limit and using said comparison to detect said user-enclosed region of said document image;

an extraction module connected to said detection analysis module for removing said user-enclosed region from said document image by identifying a leftmost black pixel and a rightmost black pixel for each scan line of said user-enclosed region.

11. A method for extracting an user-enclosed region of a document image, comprising the steps of:

identifying a plurality of connected components from said document image where each connected component has a plurality of consecutive black pixels;

extracting geometric features from said plurality of connected components;

selecting a bi-connected component from said plurality of connected components; and comparing said geometric features of said selected bi-connected component to a predetermined limit and using said comparison to detect said user-enclosed region of said document image.

12. The method of claim 11 further comprising removing said user-enclosed region from said document image by identifying a leftmost black pixel and a rightmost black pixel for each scanline of said user-enclosed region.

13. The method of claim 11 wherein said geometric features being selected from a group consisting of a bounding box, a black pixel density, a standard deviation of an average distance between the left most and the rightmost pixel along each scanline and combinations thereof.

14. The method of claim 11 wherein said predetermined limit being selected from a group consisting of the bounding box having a width and height that is a predetermined percentage of the document image width and height, the black pixel density of the connected component where said density is a predetermined percentage, the standard deviation is a predetermined percentage and combinations thereof.

15. The method of claim 11 wherein said selecting of the bi-connected component uses a depth-first search for locating a plurality of said bi-connected components within the document image.

16. The method of claim 11 wherein said geometric features of said plurality of connected components being selected from the group consisting of an area of the connected component, a bounding box, a black pixel density of the bounding box, a number of holes, a number of upward and downward arcs, a number of downward ends, a number of upward ends and combinations thereof.

17. The method of claim 11 further comprising the steps of:

storing a connected component as a plurality of nodes for representing black segments in every scan line and their relationship between scan lines.

18. The method of claim 11 further comprising the steps of:

storing said extracted geometric features of said plurality of said connected component in a geometric features database.

19. The method of claim 11 further comprising the steps of:

storing said user-enclosed region of said document image in a storage device.

20. A method for extracting an user-enclosed region of a document image, comprising the steps of:

identifying a plurality of connected components from said document image where each connected component has a plurality of consecutive black pixels;

extracting geometric features of said connected component where said geometric features being selected from the group consisting of an area of the connected component, a bounding box, a black pixel density of the bounding box, a number of holes, a number of upward and downward arcs, a number of downward ends, a number of upward ends and combinations thereof;

selecting a bi-connected component from said plurality of connected components;

comparing said geometric features of said selected bi-connected component to a predetermined limit and using said comparison to detect said user-enclosed region of said document image; and removing said user-enclosed region from said document image by identifying a leftmost black pixel and a rightmost black pixel for each scan line of said user-enclosed region.

* * * * *